United States Patent
Komisky

(10) Patent No.: US 7,219,152 B2
(45) Date of Patent: *May 15, 2007

(54) PACKET FILTERING METHODS AND SYSTEMS

(75) Inventor: Dennie Komisky, Manchester, NH (US)

(73) Assignee: Bluefire Security Technologies, Inc., Baltimore, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 11/216,174

(22) Filed: Sep. 1, 2005

(65) Prior Publication Data

US 2006/0007860 A1    Jan. 12, 2006

Related U.S. Application Data

(63) Continuation of application No. 10/166,056, filed on Jun. 11, 2002, now Pat. No. 6,963,913.

(60) Provisional application No. 60/296,763, filed on Jun. 11, 2001.

(51) Int. Cl.
*G06F 15/173* (2006.01)
*G06F 9/45* (2006.01)
*H04L 9/00* (2006.01)

(52) U.S. Cl. .............. 709/225; 713/154; 713/160; 717/139; 717/140

(58) Field of Classification Search ................. None
See application file for complete search history.

(56) References Cited

U.S. PATENT DOCUMENTS

| | | | |
|---|---|---|---|
| 5,864,683 A | 1/1999 | Boebert et al. | |
| 5,987,611 A | 11/1999 | Freund | |
| 6,182,228 B1 | 1/2001 | Boden et al. | |
| 6,233,686 B1 | 5/2001 | Zenchelsky et al. | |
| 6,266,707 B1 | 7/2001 | Boden et al. | |

FOREIGN PATENT DOCUMENTS

WO    WO 00/56024    9/2000

OTHER PUBLICATIONS

Supplementary European Search Report, dated Oct. 27, 2005, for European Patent Appl. No. 02732055.5, 3 pages.
International Search Report for PCT Application No. PCT/US02/18108, issued Oct. 23, 2003.
Supplementary European Search Report, dated Oct. 27, 2005, for European Patent Appl. No. 02732055.5, 3 pages.

*Primary Examiner*—Hoang-Vu Antony Nguyen-Ba
(74) *Attorney, Agent, or Firm*—Sterne, Kessler, Goldstein & Fox P.L.L.C.

(57) ABSTRACT

Small, optimized sequences of binary 5-tuples, representing filter rules, which achieve space efficient packet filtering. A post-match procedure table allows dynamic and extensible packet processing. Packet filtering is accomplished by processing filter rule statements and procedure statements, entered by a user in a rules file, to generate 5-tuple filtering rules and a procedure table, and loading the filtering rules and procedure table into the filter interpreter. A filter interpreter then applies the resolved filtering rules for each packet received at the network adapter. When a filtered packet matches a rule, a specified function is invoked.

43 Claims, 5 Drawing Sheets

PACKET FILTERING METHODS AND SYSTEMS

CROSS-REFERENCE TO RELATED APPLICATIONS

This application is a continuation of U.S. Application Ser. No. 10/166,056, filed Jun. 11, 2002, now U.S. Pat. No. 6,963,913, which claims the benefit of U.S. Provisional Application No. 60/296,763, filed Jun. 11, 2001, each of which is incorporated herein in its entirety by reference.

COPYRIGHT CLAIM

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

This invention pertains to packet filtering. More specifically, it relates to a use of small, optimized sequences of binary 5-tuples representing filter rules to achieve space efficient packet filtering, and the use of a procedure table to support dynamic and extensible processing behavior at the occurrence of a triggering event.

2. Related Art

Packet filtering is a function which provides network access control, or firewall-type, capabilities to various network systems. Packet filtering achieves such firewall-type capabilities by checking each network packet sent from or received by a networked device, or node, in a communications network, and making a decision based on such a check.

Most packet filters in the prior art allow network administrators, system administrators, networked device owners, and the like to define specific filtering rules via an operational graphical user interface (GUI). However, most packet filters simply allow a user to specify whether a packet should be discarded or allowed to continue based on such decisions. These are termed "deny" and "allow" actions, or rules. Those approaching the state of the art, such as the system taught by U.S. Pat. No. 6,182,228 B1, to Edward Boden et.al., which issued Jan. 30, 2001 (the '228 patent), have increased the number of actions available to packet filters to include an action that logs specific information based on packet data.

Allow, deny, and log filter rules are most commonly entered as an ordered list of rules which are processed sequentially from top to bottom, where the order is specified by the rule author, often a system or network administrator. Each rule allows or denies a certain kind of network traffic. In more secure packet filters, packet processing continues through all rules until the packet is explicitly allowed, explicitly denied, or there are no more rules, in which case the packet is denied. Usually fairly large, complex filter rule sets must be written for each protocol a networked device is to support.

SUMMARY OF THE INVENTION

Accordingly, the present invention is directed to a compact, extensible packet filtering system and methods that substantially obviate one or more of the problems due to limitations and disadvantages of the related art.

It is therefore an object of the present invention to provide an improved packet filtering system and method.

It is a further object of the invention to provide a space efficient packet filtering system and method.

It is also an object of the invention to provide a dynamic and extensible filtering system and method.

Additional features and advantages of the invention will be set forth in the description which follows, and in part will be apparent from the description, or may be learned by practice of the invention. The objectives and other advantages of the invention will be realized and attained by the structure particularly pointed out in the written description hereof as well as the appended drawings.

In accordance with an embodiment of the present invention, a system and method for filtering packets at or above the network adapter, or data link, level in a network protocol software stack is provided. Filtering of packets at or above the network adapter level is accomplished by processing filter rule statements and procedure statements entered by a user in a rules file or rules database (collectively "rules file"). Such rules files can be converted into 5-tuple filtering rules and a procedure table, which can be loaded into a filter interpreter. A filter interpreter can then interpret and resolve user-generated filtering rules for each packet received by a network adapter, either at the adapter or through low level network software.

For small, networking-equipped devices, such as, but not limited to, personal digital assistants (PDAs), cellular telephones, pagers, wrist watches, cameras, and the like (collectively "networked devices"), it is preferable that the filtering actions be as time efficient and space efficient as possible because of the limited processing power and small amount of memory available in such devices, and because of the potentially large number of filter rules that might have to be processed for each packet. Unnecessarily large filter files or overly time consuming filtering rules may interfere with other uses of the device and might cause throughput or other undesirable performance problems. Thus, unlike prior art systems in which each packet that flows through the system must be processed by all filter rules, the present invention intelligently applies only the necessary rules to a packet once the packet has been identified.

While some in the prior art, such as the '228 patent, have created systems based around filtering rules with six or more parameters, the present invention implements 5-tuple rule definitions. This reduction results in a greater level of flexibility, increased performance, and reduced storage requirements over the prior art. Such improvements can be particularly advantageous when the present invention is used on computing devices with only limited storage and processing capabilities.

Other features and advantages of the present invention will become apparent from the following detailed description of the present invention, taken in conjunction with the accompanying drawings. It is to be understood that both the foregoing general description and the following detailed description are exemplary and explanatory.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to preferred embodiments of the present invention, examples of which are illustrated in the accompanying drawings. Among the advantages of the present invention over the prior art are generation and testing of very compact packet filters that can be executed in the network software stack; separation and expansion of processing options after a packet filter identifies a packet without burdening all packet filters with unnecessary overhead; and dynamic process alteration when a packet filter identifies a specific packet, without changing or adding filter rules.

Figure 1:
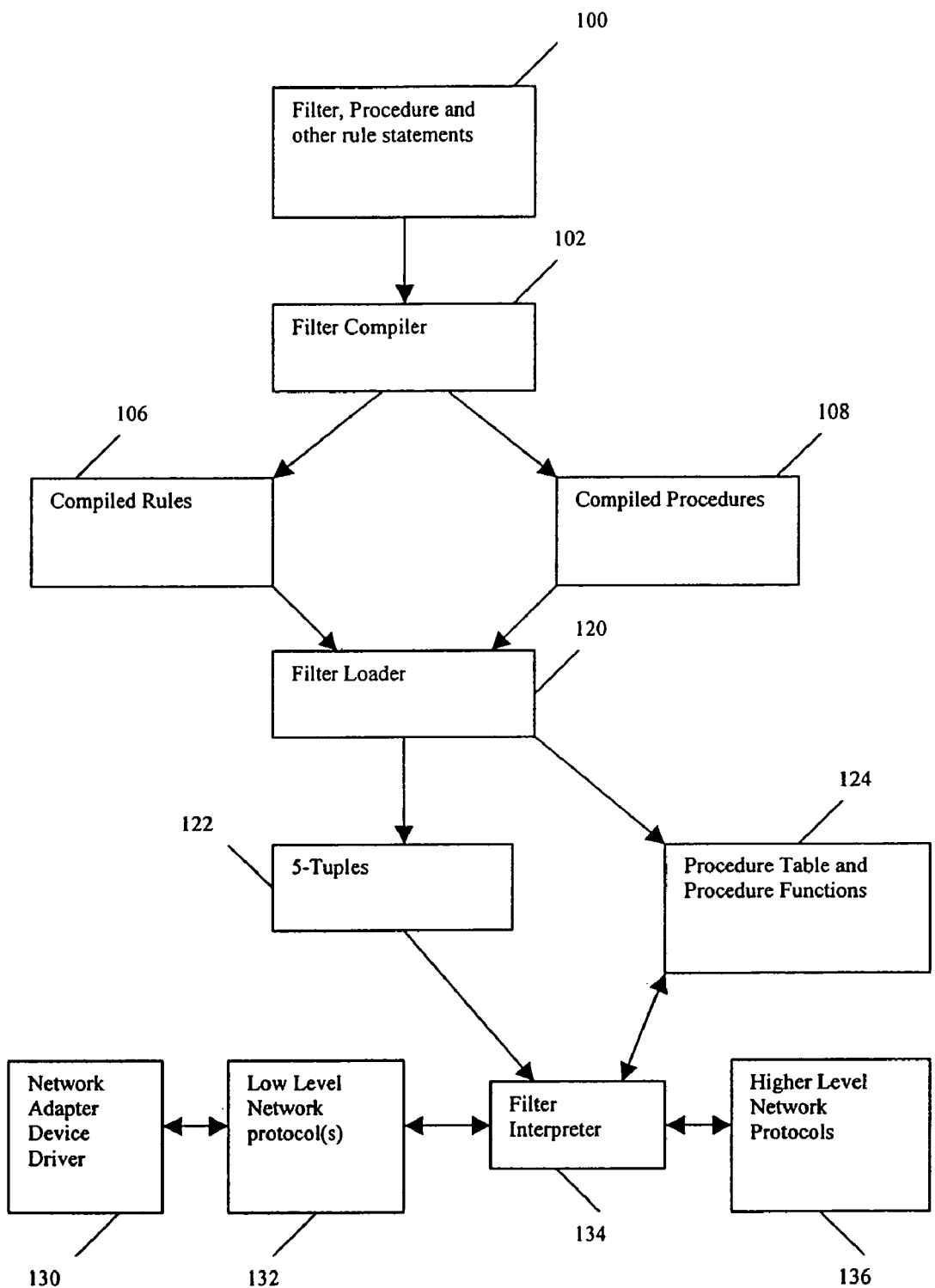
FIG. 1 is a flow chart illustrating a preferred data flow.

FIG. 1 illustrates key elements of a preferred embodiment of the present invention, and the logical relations and data flow among such elements. The embodiment illustrated in FIG. 1 is concerned with translation of filter, procedure, and other rule statements 100 to a 5-tuple representation 122 and a procedure representation 124, and interpretation 134 of 5-tuples 122 as network packets flow through network software 132 and 136.

Filter, procedure, and other rule statements 100 are processed by filter compiler 102. Filter compiler 102 can be implemented using code similar to the pseudocode presented in Tables 1 and 2, below. Table 1 provides sample pseudocode for processing filter statements, and Table 2 provides sample pseudocode for processing procedure statements. Filter compiler 102 outputs rules file 106 and procedure file 108. Rules file 106 contains a binary representation of rules to be applied by a filter. Rules file 106 may take the form of machine readable code, such as Java™ bytecodes, machine language, and the like. Procedures file 108 contains a binary representation of the policies to be applied by a filter. Procedures file 108 is preferably a combination of a table of procedure indices and a set of procedure functions compiled into machine-readable code, such as Java™ bytecodes, machine language, and the like. Rules file 106 and procedures file 108 can be generated for each network adapter to which rules are to be applied, or rules file 106 and procedures file 108 may be replicated across a range of networked devices.

TABLE 1

Processing Filter Statements
/* Processing filter statements to generate 5-tuples */
   create 5-tuple buffer to hold constructed 5-tuples;
   set 'nexttuplepointer' to beginning of 5-tuple buffer;
   set 'nextrulepointer' to beginning of 5-tuple buffer;
   while (more rule statements exist in file) {
     if (rule statement is a filter statement) {
       for (each logical condition in statement) {
         construct 5-tuple for condition;

TABLE 1-continued copy to 'nexttuplepointer' of 5-tuple buffer;
         increment 5-tuple buffer 'nexttuplepointer';
       }
       increment nextrulepointer;
       for (each 5-tuple generated for this filter rule) {
         set 'rule offset' 5-tuple element =
           nextrulepointer − address of 5-tuple;
       }
       construct default last 5-tuple;
       copy to 'nexttuplepointer' of 5-tuple buffer;
       increment 5-tuple buffer 'nexttuplepointer';
     }
     else {/* process other statements as usual*/}
   }
   write rule file for each network adapter;

TABLE 2

Processing Procedure Statements
/* Processing procedure statements to generate procedure table */
   create procedure buffer to hold constructed procedure table;
   set 'nextprocpointer' to beginning of procedure buffer;
   while (more procedure statements exist in file) {
   if (rule statement is a procedure statement) {
     construct procedure index entry;
     copy to 'nextprocpointer' of procedure buffer;
     increment procedure buffer 'nextprocpointer';
   else {/* process statement as usual*/}
   }
   write procedure file for each network adapter When either or both network adapter device driver 130 or low level network protocol 132 are initialized, filter loader 120 executes. Sample filter loader 120 execution pseudocode is provided below in Tables 3 and 4. Table 3 provides pseudocode for loading procedure tables, and Table 4 provides pseudocode for loading 5-tuples.

TABLE 3

Loading Procedure Table
/* Load & resolve procedure indexes */
   load procedure function library;
   read procedure file;
   load procedure table into filter interpreter;
   for (every procedure index entry) {
     load index entry with pointer to procedure function;
   }

TABLE 4

Loading 5-tuple Table
/* Load 5-tuple table */
   read rules file;
   load rules into filter interpreter;

In a preferred embodiment, execution or initialization of filter loader 120 can also cause filter interpreter 134 to load 5-tuple rules 122 and procedure table 124. Once loaded, 5-tuples 122 can be used by filter interpreter 134 as network packets enter and leave the system via device driver 130 to one or more network adapters, not shown. Pseudocode implementing a process by which 5-tuples can be interpreted by filter interpreter 134 is provided below in Table 5.

TABLE 5

```
Interpreting 5-tuples
/* Interpreting 5-tuples
   Code is invoked for each packet
Returns a code to caller for indicate allow, deny or reject action */
Get 5-tuple pointer to first 5-tuple;
    while (TRUE) {
        If (Length == 0) {/* Assume match - Final 5-tuple */
            Policy return code = Call Procedure Function based on
                Procedure Index element in 5-tuple;
            Return (Procedure Return Code);
                /* caller does actual allow,
                   deny or reject action */
}
Extract bit offset from data offset; /* may be zero */
Clear bit offset in data offset;
Add data offset to packet pointer;
if (Extract(Length, packet data at packet pointer, bit offset) ==
       data value) {/* extract data from packet and test */
            /* length can be byte size or
               bit size */
            /* match */
    /* decide on action to take for match */
        if NEXT Flag == SET && /* rule has more 5-tuples? */
            Procedure Index == 0 {/* AND with next 5-tuple? */
                set 5-tuple pointer to next 5-tuple; /* continue rule */
        } else {/* invoke procedure */
            Procedure return code = Call
            Procedure Function based on
                Procedure Index element in 5-tuple;
            Return (Procedure Return Code);
                /* caller does actual allow or
                   deny or reject action */
        }
    } Else {/* no match */
    /* decide on action to take for mismatch */
        if NEXT Flag == SET /* rule has more 5-tuples? */
            if Procedure Index == 0 {/* Logical AND */
                add Rule Offset to 5-tuple
                pointer; /* skip rest of rule */
            else /* Logical OR with next 5-tuple */
                set 5-tuple pointer to next
                5-tuple; /* continue with rule */
        else /* end of rule */
            add Rule Offset to 5-tuple pointer;
            break; /* leave while loop */
    }
}
```

Network adapters are typically embedded into or removably coupled to a device. Such network adapters can take the form of wired devices, such as, but not limited to, those implementing the Institute of Electrical and Electronics Engineers (IEEE) 802.3™ or 802.5™ standards, including Fiber Distributed Data Interface (FDDI) standard, 10Base-2 standard, 100Base-FX standard, 100Base-TX standard, and the like, and wireless devices, including, but not limited to, radio frequency, optical, acoustic, or magnetic induction transmitters, such as those implementing one of the IEEE 802.11™ standards, the Bluetooth® short range wireless connectivity standard, and the like. Network adapters typically communicate with the device into which they are embedded or to which they are attached by presenting an interface data structure to which the device has access.

A device developer or manufacturer will typically write device driver code 130 to allow the device, which may operate using a certain set of commands and with a certain data structure, to effectively and efficiently communicate with a network adapter, which may use a different set of commands and a different data structure. Device driver code 130 usually translates a device's command and data structure into command and data structures used by the network adapter, and vice versa. In most embodiments, device driver code serves as an interface between a network adapter or other peripheral attached to or embedded in a device and an operating system running on the device. Data or commands (collectively "data") received from or destined for a peripheral is routed through a device driver so that the data can be translated into the necessary format. Although the description above details the use of explicit device driver code, it should be apparent to one skilled in the art that even in such circumstances where a device does not explicitly support the use of device drivers, software or hardware which allows a device to interface with a network adapter is the functional equivalent of a device driver, and may be substituted for a device driver without departing from the spirit or the scope of the present invention.

It is presently preferred that filter interpreter 134 be implemented as low on the protocol stack, or as close to the network adapter, as possible. FIG. 1 illustrates one possible embodiment of the present invention with respect to device driver code 130 and low level network protocol software 132. In this embodiment, filter interpreter 134 can communicate with one or more network adapters through device driver code 130. In the alternative embodiment illustrated in FIG. 2, filter interpreter 134 communicates with one or more network adapters through low level network protocol software 132.

Figure 2:
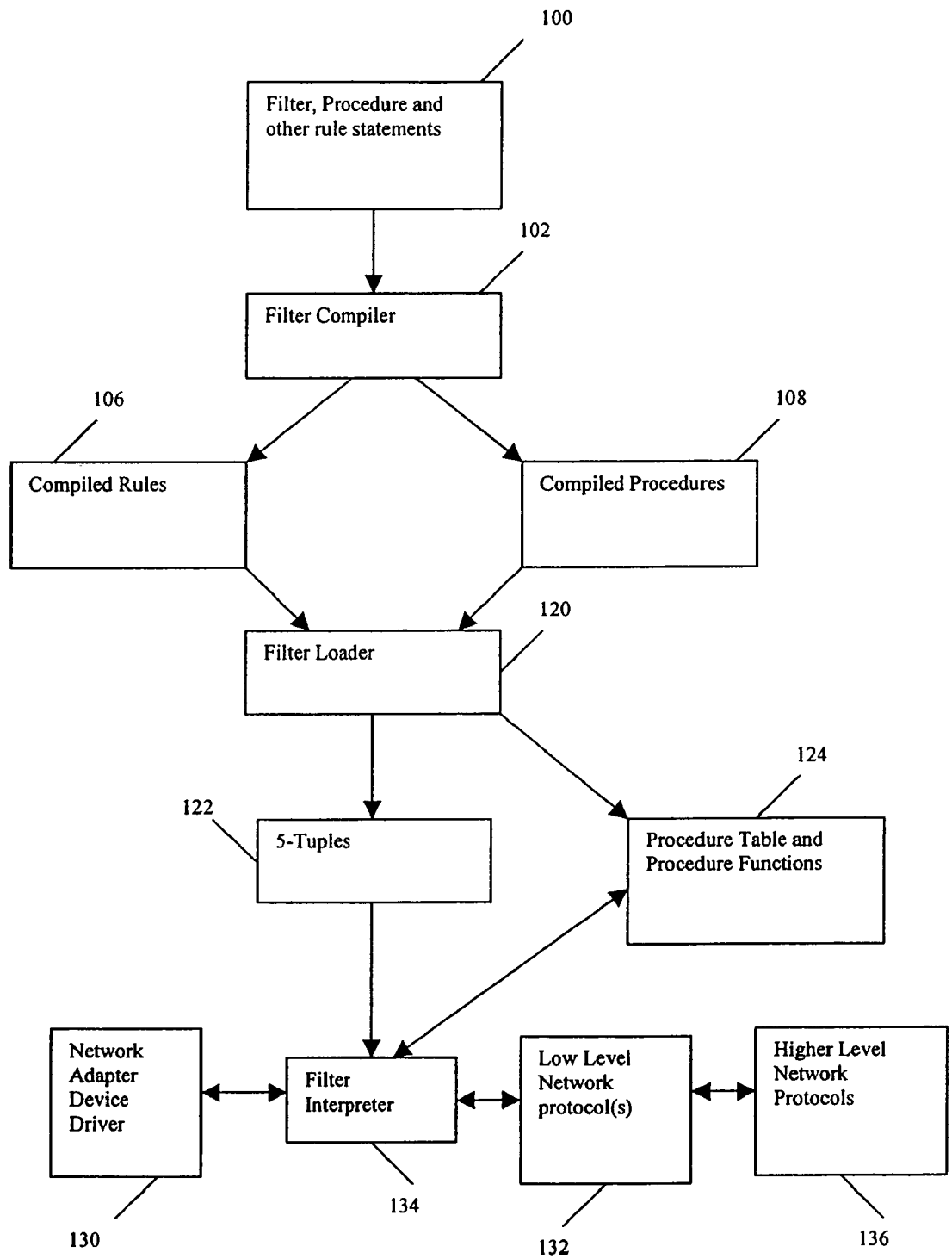
FIG. 2 is a flow chart illustrating a preferred data flow.

As both FIGS. 1 and 2 illustrate, filter interpreter 134 implements filter rules, illustrated as 5-tuples 122, and procedures, illustrated as procedure table and procedure functions 124, prior to passing any incoming packets to low level network protocols 132 or higher level network protocols 136, such as the Transmission Control Protocol (TCP), the User Datagram Protocol (UDP), the Network Basic Input/Output System (NetBIOS) application programming interface, the Sequenced Packet Exchange (SPX) standard, the Bluetooth® short range wireless connectivity standard, and the like. In addition, the embodiments illustrated in FIGS. 2 and 3 allow filter interpreter 134 to implement filter rules and procedures prior to passing any outgoing packets to device driver code 130 or low level network protocol 132. In still another embodiment, filter interpreter 134 may intercept incoming network packets at one protocol stack level, preferably close to the network adapter, while outgoing packets are intercepted at another, possibly higher level. It should be apparent to one skilled in the art that although the above discussion focuses primarily on implementing filter interpreter 134 as close to the network adapter as possible, filter interpreter 134 can be implemented at alternative levels without departing from the spirit or the scope of the present invention.

Figure 3:
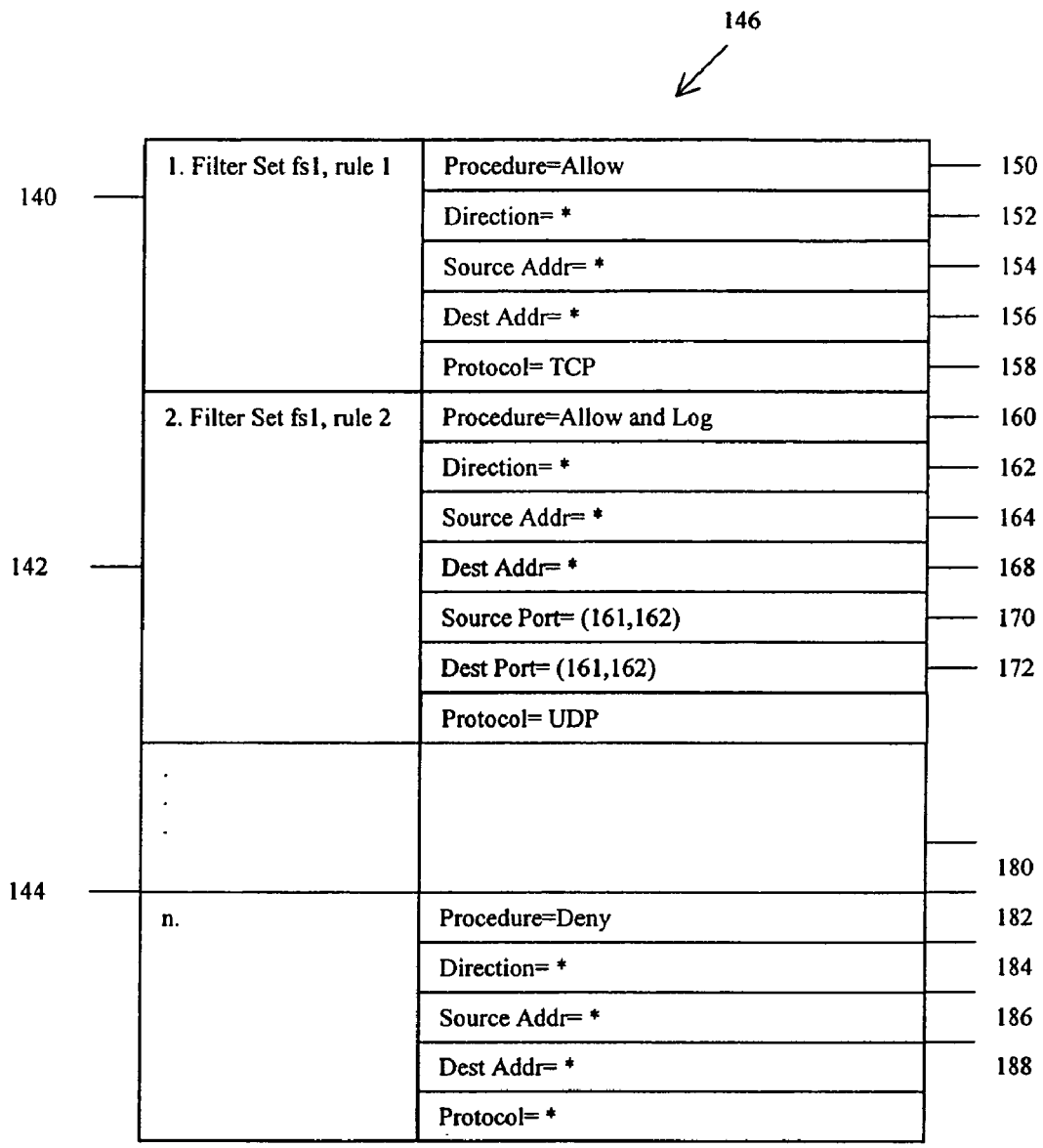
FIG. 3 is a set of sample filter rules.

FIG. 3 illustrates sample filter rule statements 100 as entered by a network or system administrator and received by filter compiler 102. Three example rules 140, 142 and 144 are shown. The first two, rules 140 and 142, are rules which have been explicitly entered by a system administrator. In a preferred embodiment, the last, rule 144, which is also called the "default deny" rule, is generated automatically by filter compiler 102. Alternatively, the user interface which allows a system administrator, network administrator, or other user to enter rules may allow the user to enable or disable the inclusion of a "default deny" rule. Where such inclusion is disabled, a "default allow" rule may be substituted. When a "default deny" rule is used, a preferred approach to ordering filter rules 146 is to write rules which allow desired or desirable network traffic to continue. Any packets not matching some rule explicitly allowing the packet to continue, such as rules 140 and 142, will be discarded by the default Deny rule 144.

Rule 140 for filter set fs1 includes Procedure=Allow 150, and selectors Direction=* 152 (where * means "any"), source address Source Addr=* 154, destination address Dest Addr=* 156, and protocol Protocol=TCP 158. Rule 142 for filter set fs1 includes Procedure=Allow and Log 160, and selectors Direction=* 162, Source Addr=* 164, Dest Addr=* 166, Protocol=UDP 168, source port Source Port=(161,162) 170, destination port Dest Port=(161,162) 172. Rule n 144 includes Procedure=Deny 180, and selectors Direction=* 182, Source Addr=* 184, Dest Addr=* 186, and Protocol=* 188. Although the example illustrated in FIG. 3 refers to specific field names, it should be appreciated by one skilled in the art that such field names are arbitrary and could include any or all fields, or other similar information, transmitted with a packet oriented protocol supported by a device.

Rules 140, 142 and 144 are logically processed top-to-bottom for each packet. Thus, if a packet meets all of the aspects set forth in a given rule, then an appropriate procedure function, as specified in the rule (blocks 150, 160 or 180 in FIG. 2), is invoked. By way of example, without intending to limit the present invention, for rule 140, Procedure=Allow 150 can be interpreted as "invoke the Allow procedure function", which allows the packet to continue. If a given packet does not match a first rule 140, the packet is checked against a subsequent rule 142. This process repeats until the last rule 144. When used, a default deny rule 144 is configured to match any packet and invokes Procedure=Deny 180, which means the packet is processed by the Deny procedure function and discarded (i.e., not allowed to continue).

In the embodiment illustrated in FIG. 3, first filter rule 140 will allow all Transmission Control Protocol/Internet Protocol (TCP/IP) datagrams, from any source, to any destination. Second filter rule 142 will allow UDP traffic if the source port or destination port is 161 or 162. These are well-known ports for the Simple Network Management Protocol (SNMP), so this rule allows SNMP traffic (as an example). The Filter Set name ("fs1") is used to associate filter rule sets with specific network adapters via a NETWORK_INTERFACE statement at the beginning of a rule set (not shown). With this statement, one or more filter sets are associated with one or more network adapters. In a preferred embodiment, only the filter sets associated with a network adapter are loaded by the filter loader for that network adapter. This means that each network adapter must have its own filter loader with its own separate copy of the filter rules. While this increases the overall storage requirement, a preferred binary rule implementation produces rule sets which are small enough so as to not typically impose significant storage requirements on a device. Although the use of separate filter loaders and filter rules for each network adapter is presently preferred, it should be apparent to one skilled in the art that the number of filter rules and filter loaders in memory at any time may be reduced through various techniques without departing from the spirit or scope of the present invention. In addition, although the NETWORK_INTERFACE field is preferably included in the header of a rule set, the NETWORK_INTERFACE field, or other such fields, may be located at other positions within a rule set, or even external to a rule set, without departing from the spirit or the scope of the present invention.

Figure 4:
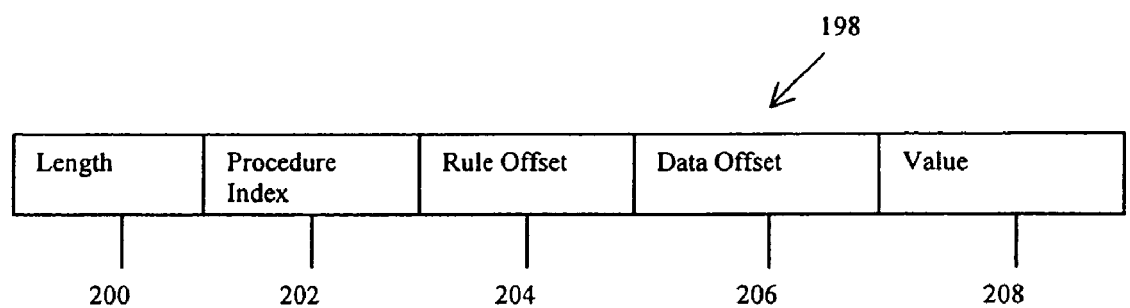
FIG. 4 is a block diagram illustrating the format of a 5-tuple in accordance with the preferred embodiment of the invention.

Referring to FIG. 4, the logical structure of each 5-tuple includes length 200, procedure index 202, rule offset 204, data offset 206, and value 208. Length 200 represents the length of the comparison to be performed (e.g. one octet, two octets, etc.). Length 200 can also indicate the bits of an octet, for example flag bits, to be compared with value 208.

Procedure index 202 is an index, or pointer, to a procedure table entry pointing to the procedure table function which is to be executed if a comparison is true. Table 6, below, provides sample pseudocode for implementing procedure functions.

TABLE 6

Representative Procedure Functions
bool allow(tuple_pointer, packet_pointer) {return allow_code;}
bool allow_and_log(tuple_pointer,
packet_pointer) {write log entry, return
    allow_code;}
bool allow_and_alarm(tuple_pointer, packet_pointer) {generate alarm,
    return allow_code; }
bool allow_and_sanitize(tuple_pointer, packet_pointer) {sanitize, return
    allow_code; }
bool allow_and_update_state_table(tuple_pointer,
packet_pointer) {update
    table, return allow_code; }
bool allow_HTTP and_Rewrite(tuple_pointer, packet_pointer) {rewrite
    HTTP, return allow_code; }
bool deny(tuple_pointer, packet_pointer) {return deny code; }
bool deny_and_log(tuple_pointer, packet_pointer)
{write log entry, return
    deny code;}
bool deny_and_alarm (tuple_pointer, packet_pointer) {generate alarm,
    return deny code;)

As Table 6 shows, all procedures return an action code to Allow, Deny, or Reject a packet in a preferred embodiment of the present invention. Additional action codes and special packet processing procedures are easily implemented with this scheme. In a preferred embodiment, such additional packet processing procedures can include, but are not limited to, logging, alarming, sanitizing, and combinations thereof. A partial list of such procedures implemented in a preferred embodiment is illustrated by packet processing procedures 340 through 348 of FIG. 5. As an example of a combination procedure, if the procedure is DENY_AND_LOG in the rule's procedure element, then a log entry is created that provides direct user visibility of the filter processing, and the packet is denied.

Such logging may be useful, as a log can be used to debug and verify filter rules, and to detect attacks. In a preferred embodiment, information contained in each log entry for IP packets includes: procedure index element (ALLOW_AND_ LOG, DENY_AND_LOG, etc.), direction of packet (inbound or outbound), source and destination IP addresses, source and destination port numbers value in the packet at the offset, and enough information to identify the filter 5-tuple, such as, the actual filter rule 5-tuple or the offset of the starting location of the filter rule. Each logged and filtered protocol can use the extensible procedure architecture of the present invention to implement unique log entry generators with any combination or format of available fields and information.

Rule Offset 204 is a number that is the byte offset from the current 5-tuple in the rule table to the next rule in the rule table. If the 5-tuple does not match the packet, then the filter interpreter will select the next rule by adding the Rule Offset to the address of the current 5-tuple, except when a special flag, called the NEXT flag, is set. If the 5-tuple does not match the packet, the NEXT flag is set, and the Procedure Index is valid, the filter interpreter will select the next 5-tuple by adding the size of the current 5-tuple to the address of the current 5-tuple. The filter compiler ensures that the Rule Offset is never zero. To further elaborate on the use of the NEXT flag, if the NEXT flag of rule offset 204 is set, the filter interpreter steps to the next 5-tuple of a rule for comparison. If the NEXT flag is set and the Procedure Index is empty or null after a comparison is true, the result of the next comparison is Logically ANDed to the current comparison. If after a comparison is false, the NEXT flag is set and the Procedure Index is valid, the next comparison is Logically ORed to the current comparison.

Data Offset 206 is a number that is the offset into a packet to a field in that packet that will be checked by this 5-tuple. Data offsets allow the present invention to access any field or data position within a network protocol packet or other network transmission. By way of example, without intending to limit the present invention, data offset 206 can be the octet offset or the combination of the octet offset and bit offset within the octet. The filter compiler ensures that the last 5-tuple of a rule set includes a Deny procedure index. Optionally, the filter compiler can generate a last 5-tuple of a rule set that includes an Allow procedure index. It should be appreciated by one skilled in the art that a data offset could be directly modified during rule loading or combined during rule processing with a base packet offset that varies depending upon the network protocol level at which the filter rules are applied, to adapt the rules to operate at a variety of network stack levels.

Value 208 is the value to be compared against the field in the packet accessed by data offset 206. With this 5-tuple element, the logical operation of the 5-tuple can now be expressed as "operand1, equal?, operand2". Operand1 is obtained from the packet data at data offset 206 and operand2 is 5-tuple element value 208. "Equal?" refers to a test for equality. Hence, a 5-tuple can represents expressions such "source port number, equal?, test port number". Although an equality test is used as part of a preferred embodiment of the present invention, it should be obvious to one skilled in the art that alternative mathematical tests can be substituted without departing from the spirit or the scope of the invention.

Figure 5:
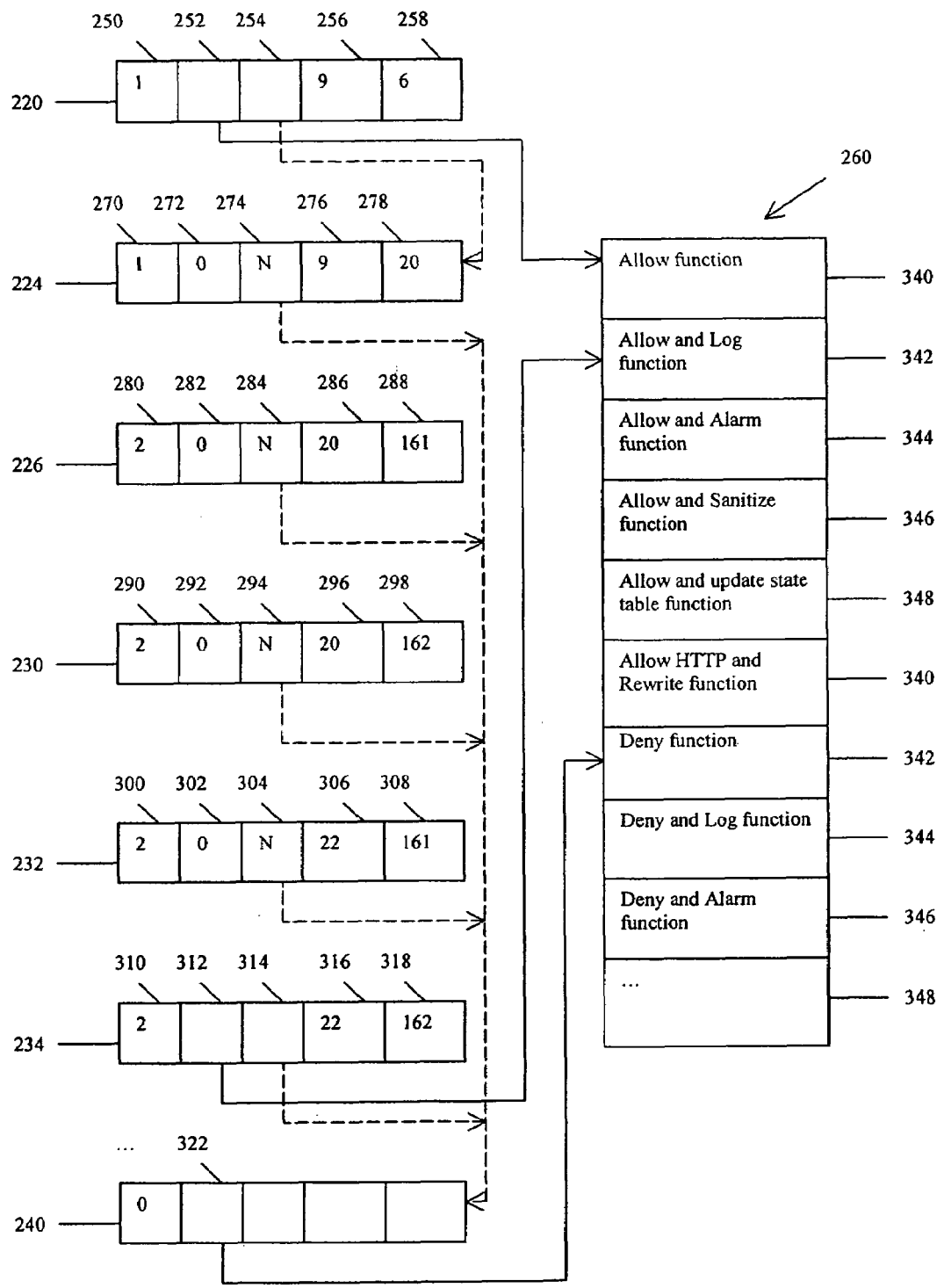
FIG. 5 is a block diagram illustrating the logical structure of a 5-tuple for the example set of FIG. 1 at a point following the loading step of FIG. 1 in accordance with the preferred embodiment of the present invention.

FIG. 5 illustrates a set of 5-tuples 220, 224, 226, 230, 232, 234 and 240, corresponding to the three filter rules 140, 142, and 144 of FIG. 3. Table 7 presents an alternative representation of these 5-tuples. "NEXT+" refers to a set NEXT flag logically ANDed with a rule offset. Referring to FIG. 5, the "N" in blocks 274, 284, 294, and 304 correspond to a set NEXT flag.

TABLE 7

5-tuples:
   (1,procedureindex1, ruleoffset1,9,6)
   (1,,NEXT+ruleoffset2,9,20)
   (2,,NEXT+ruleoffset3,20,161)
   (2,,NEXT+ruleoffset4,20,162)
   (2,,NEXT+ruleoffset5,22,161)
   (2,procedureindex2,ruleoffset6,22,162)...
   (0,procedureindex7,,,)

All 5-tuples have five elements, some of which might be null (binary 0) or some other unused value.

In Table 7, procedureindex1 corresponds to procedure index 252 and procedure table entry 340 in FIG. 5, procedureindex2 corresponds to procedure index 312 and procedure table entry 342 of FIG. 5, and procedureindex7 corresponds to procedure index 322 and procedure table entry 342 of FIG. 5.

Of course, a direct in-memory form of 5-tuples does not contain ")" or ",", is not on separate lines, and is simply T*S 8-bit octets of binary data, where T is the number of 5-tuples and S is the size, in this specific example, in 8-bit octets of a 5-tuple. There is no effective limit on the number of filter rules a user may define or on the resulting size of 5-tuples (the total length in octets of 5-tuples 122).

Table 72 and FIG. 5 do not show procedure resolutions. Each of the procedure values shown (252, 272, 282, 292, 302, 312, 322) is actually an index, or pointer, into a table of address pointers to function entry points. The procedure functions take two arguments, a pointer to the current 5-tuple that contains their procedure index and a pointer to the packet, and return a return code. The procedure function may modify the packet before returning.

Referring to the example of FIG. 5, after the interpretation of 5-tuple 220 with packet data matching the value 258, the arguments to function Allow 340 include 220 (that is, a pointer to 5-tuple 220) and a pointer to the packet (not shown). It should be apparent to one skilled in the art that additional or alternative arguments may be supplied without departing from the spirit or the scope of the present invention. This architecture expands the processing options of the procedure functions and simplifies the use of these functions 340 through 348 by filter interpreter 134 of FIG. 1, and keeps the filter interpreter small.

In FIG. 5, the ellipses below 5-tuple 234 denote that additional, arbitrary numbers of 5-tuples follow, and these ellipses correspond to ellipses below rule 142 in FIG. 3. Thus, 5-tuple representations are provided in FIG. 5 for all rules shown in FIG. 3. The correspondence between filter statements 140, 142, and 144 and the 5-tuples in FIG. 5 is as follows: 140 corresponds to 220; 142 corresponds to 224, 226, 230, 232, 234; and 144 corresponds to 240.

The values 9, 20, 22 in the 5-tuple offset elements 256, 286 and 306, respectively, are the octet data offset into an IP datagram at which the appropriate field is found. 9 corresponds to (is the offset to) the protocol field in an IP datagram. Similarly, 20 corresponds to the IP source port and 22 corresponds to the IP destination port. The values in the 5-tuple value elements (blocks 258, 278, 288, 298, 308 and 318) are 6 (TCP), 20 (UDP), and so forth.

In FIG. 5, the ellipses in box 348 also denote that additional, arbitrary procedure functions follow. There is no limit to the size of the procedure table 260 or the number of procedure functions.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for filtering a packet at a network interface, comprising the steps of:
(1) receiving, at a compiler, a procedure statement and a filter statement;
(2) processing, in a single invocation at the compiler, the procedure statement and the filter statement so that the procedure statement has a table format with a procedure index and a procedure function and the filter statement has a 5-tuple format with a corresponding procedure index; and
(3) loading the procedure statement and the filter statement from the compiler to an interpreter.

2. The method of claim 1, wherein said loading occurs when a loader is one of executed and initialized.

3. The method of claim 1, further comprising the step of:
(4) transmitting the procedure statement and the filter statement to the compiler.

4. The method of claim 1, further comprising the steps of:
(4) performing a comparison of a portion of the packet with a portion of the filter statement; and
(5) invoking a corresponding procedure function if the comparison has a first result that is true.

5. The method of claim 4, wherein said performing occurs when the packet is being transferred between a network adapter device driver and a low level network protocol.

6. The method of claim 4, wherein said performing occurs when the packet is being transferred between a low level network protocol and a high level network protocol.

7. The method of claim 4, wherein the comparison comprises an equal to comparison.

8. The method of claim 4, wherein the corresponding procedure function comprises at least one of an allow the packet function, a deny the packet function, a reject the packet function, a log function, an alarm function, and a sanitize function.

9. The method of claim 4, wherein the filter statement is one of a plurality of filter statements arranged in a sequence and further comprising the step of:
(6) proceeding to a subsequent filter statement in the sequence if the comparison has a second result, the second result different from the first result.

10. The method of claim 9, further comprising the step of:
(7) generating, automatically by the compiler, a final filter statement in the sequence.

11. A system for filtering a packet at a network interface, comprising:
a compiler configured to receive a procedure statement and a filter statement and to process, in a single invocation, said procedure statement and said filter statement so that said procedure statement has a table format with a procedure index and a procedure function and said filter statement has a 5-tuple format with a corresponding procedure index;
an interpreter configured to perform a comparison of a portion of the packet with a portion of said filter statement and to invoke a corresponding procedure function if said comparison has a first result that is true; and
a loader coupled between said compiler and said interpreter and configured to load said procedure statement and said filter statement from said compiler to said interpreter.

12. The system of claim 11, wherein said loader is configured to load said procedure statement and said filter statement from said compiler to said interpreter when said loader is one of executed and initialized.

13. The system of claim 11, further comprising a user interface coupled to said compiler and configured to transmit said procedure statement and said filter statement to said compiler.

14. The system of claim 11, wherein said interpreter is further configured to perform said comparison when the packet is being transferred between a network adapter device driver and a low level network protocol.

15. The system of claim 11, wherein said interpreter is further configured to perform said comparison when the packet is being transferred between a low level network protocol and a high level network protocol.

16. The system of claim 11, wherein said comparison comprises an equal to comparison.

17. The system of claim 11, wherein said corresponding procedure function comprises at least one of an allow the packet function, a deny the packet function, a reject the packet function, a log function, an alarm function, and a sanitize function.

18. The system of claim 11, wherein said filter statement is one of a plurality of filter statements arranged in a sequence and wherein said interpreter is further configured to proceed to a subsequent filter statement in said sequence if said comparison has a second result, said second result different from said first result.

19. The system of claim 18, wherein said compiler is further configured to generate a final filter statement in said sequence.

20. A method for filtering a packet at a network interface, comprising the steps of:
(1) identifying, with a first logic circuit, a portion of the packet defined by a first number of consecutive bits within the packet that starts at a second number of bits offset from a first bit of the packet;
(2) performing, with a second logic circuit, a comparison of a value at a first portion of a filter statement with the portion of the packet; and
(3) invoking, with a third logic circuit, a procedure function if the comparison has a first result that is true.

21. The method of claim 20, wherein the first number of consecutive bits within the packet is identified by a value at a second portion of the filter statement, the second portion different from the first portion.

22. The method of claim 20, wherein the second number of bits offset from the first bit of the packet is identified by a value at a second portion of the filter statement, the second portion different from the first portion.

23. The method of claim 20, wherein the procedure function is identified by a procedure index at a second portion of the filter statement, the second portion different from the first portion.

24. The method of claim 20, wherein said performing occurs when the packet is being transferred between a network adapter device driver and a low level network protocol.

25. The method of claim 20, wherein said performing occurs when the packet is being transferred between a low level network protocol and a high level network protocol.

26. The method of claim 20, wherein the comparison comprises an equal to comparison.

27. The method of claim 20, wherein the procedure function comprises at least one of an allow the packet function, a deny the packet function, a reject the packet function, a log function, an alarm function, and a sanitize function.

28. The method of claim 20, wherein the filter statement is one of a plurality of filter statements arranged in a sequence and further comprising the step of:
(4) proceeding to a subsequent filter statement in the sequence if the comparison has a second result, the second result different from the first result.

29. The method of claim 28, wherein the subsequent filter statement is identified by a number of bits in the sequence offset from a first bit of the filter statement.

30. The method of claim 29, wherein the number of bits in the sequence offset from the first bit of the filter statement is identified by a value at a second portion of the filter statement, the second portion different from the first portion.

31. The method of claim 29, wherein the number of bits in the sequence offset from the first bit of the filter statement equals a total number of bits in the filter statement.

32. A system for filtering a packet at a network interface, comprising:
- a first logic circuit configured to identify a portion of the packet defined by a first number of consecutive bits within the packet that starts at a second number of bits offset from a first bit of the packet;
- a second logic circuit configured to perform a comparison of a value at a first portion of a filter statement with said portion of the packet; and
- a third logic circuit configured to invoke a procedure function if said comparison has a first result that is true.

33. The system of claim 32, wherein said first number of consecutive bits within the packet is identified by a value at a second portion of said filter statement, said second portion different from said first portion.

34. The system of claim 32, wherein said second number of bits offset from said first bit of the packet is identified by a value at a second portion of said filter statement, said second portion different from said first portion.

35. The system of claim 32, wherein said procedure function is identified by a procedure index at a second portion of said filter statement, said second portion different from said first portion.

36. The system of claim 32, wherein said second logic circuit is further configured to perform said comparison when the packet is being transferred between a network adapter device driver and a low level network protocol.

37. The system of claim 32, wherein said second logic circuit is further configured to perform said comparison when the packet is being transferred between a low level network protocol and a high level network protocol.

38. The system of claim 32, wherein said comparison comprises an equal to comparison.

39. The system of claim 32, wherein said procedure function comprises at least one of an allow the packet function, a deny the packet function, a reject the packet function, a log function, an alarm function, and a sanitize function.

40. The system of claim 32, wherein said filter statement is one of a plurality of filter statements arranged in a sequence and wherein said second logic circuit is further configured to proceed to a subsequent filter statement in said, sequence if said comparison has a second result, said second result different from said first result.

41. The system of claim 40, wherein said subsequent filter statement is identified by a number of bits in said sequence offset from a first bit of said filter statement.

42. The system of claim 40, wherein said number of bits in said sequence offset from said first bit of said filter statement is identified by a value at a second portion of said filter statement, said second portion different from said first portion.

43. The system of claim 42, wherein said number of bits in said sequence offset from said first bit of said filter statement equals a total number of bits in said filter statement.

* * * * *

UNITED STATES PATENT AND TRADEMARK OFFICE
CERTIFICATE OF CORRECTION

PATENT NO. : 7,219,152 B2
APPLICATION NO. : 11/216174
DATED : May 15, 2007
INVENTOR(S) : Dennis Komisky It is certified that error appears in the above-identified patent and that said Letters Patent is hereby corrected as shown below:

Title Page
Item (75), Inventor section, "Dennie Komisky" replace with --Dennis Komisky--.

Column 14
Line 14, "said, sequence" replace with --said sequence--.

Signed and Sealed this

First Day of July, 2008

JON W. DUDAS
*Director of the United States Patent and Trademark Office*